UNITED STATES PATENT OFFICE.

ADOLPH W. H. LENDERS AND PAUL W. ALLEN, OF CEDAR RAPIDS, IOWA, ASSIGNORS, BY MESNE ASSIGNMENTS, TO PENICK & FORD, LTD., INCORPORATED, A CORPORATION OF DELAWARE.

MANUFACTURE OF CORN STARCH AND PRODUCTS THEREFROM.

1,417,467. Specification of Letters Patent. Patented May 23, 1922.

No Drawing. Application filed November 18, 1918. Serial No. 263,026.

*To all whom it may concern:*

Be it known that we, ADOLPH W. H. LENDERS and PAUL W. ALLEN, citizens of the United States, residing at Cedar Rapids, in the county of Linn and State of Iowa, have invented certain new and useful Improvements in the Manufacture of Corn Starch and Products Therefrom, of which the following is a specification.

Our invention relates to the manufacture of corn or maize starch and products therefrom, and the primary object of the invention is to provide a method of treating the starch to eliminate or make inactive certain impurities which, if allowed to remain in the starch, are a source of inconvenience and expense, particularly where the starch is subsequently manufactured into conversion products such as glucose and corn sugar.

Indian corn is composed of starch, germ, hull and fibre, certain soluble substances and protein, which latter ingredient is sometimes termed "gluten," although this term is applied less appropriately to corn protein than to the protein of wheat since the corn protein is not at all glutinous in character. In the manufacture of starch from corn the soluble substances of the grain are eliminated to a considerable extent at least by the steeping of the grain, the primary purpose of which is to soften the kernel so as to facilitate the separation from the starch of the germ, the hull and fibre, and the bulk of the protein, these separating operations being ordinarily effected by mechanical means in the order named. The separation between the starch and protein is ordinarily accomplished by tabling the starch and protein magma on inclined starch tables upon which the starch granules subside and over the ends of which the protein and water tail off. By this method, which is probably the only method of making the separation between starch and protein that has been found practical for corn starch, a large proportion of the protein is removed from the starch. But it has never been found possible, so far as we are aware, to remove all of the protein in this, or, in fact, in any other manner. All commercially produced corn starches, even when subjected to repeated tabling (and this, of course, adds considerably to the expense of manufacture), contain some small quantity of protein. The presence of this residual protein, as the impurity may be termed, even when it is reduced to a minimum, gives rise to difficulties and inconveniences of a very serious character when the starch is manufactured into its conversion products, such, for example, as glucose or grape sugar.

Apparently the protein molecule is unstable and liable to disassociation under the influence of the heat and acid used for conversion of the starch. It is the presence of the residual protein in the starch which gives the liquor from the converters its brown color and which tends to impart to glucose and grape sugar made from corn the bitter taste characteristic of these products. The ordinary tabled starch will contain at least one-half of one per cent of protein (computed by weight of dry substances). It may contain considerably more. Even if the starch has less than this percentage of protein the converted liquor made therefrom will be considerably discolored, the deepness of the coloring depending somewhat upon the temperatures employed, the amount of acid used and the length of the converting operation.

As the market requires glucose and sugar as light in color as possible it has been customary in making these products to filter the converted liquor through bone char. This operation will remove the brownish color, unless the liquor has been too much discolored, but the expense of the procedure is considerable and it does not entirely eliminate the bitter principle from the product nor does it entirely remove from the product all of the protein or its derivatives. If these remain, discoloration is likely to recur after the product has stood exposed to the atmosphere or when it is heated.

In the manufacture of corn sugar, using the term as distinguishing the solid conversion product from the syrup known as glucose, the presence in the starch of the residual protein involves still further disadvantages. In the manufacture of corn sugar in a dry or pulverizable state it has always been necessary to sacrifice a part of the yield of the conversion step in the form of mother liquor or "hydrol," which is pressed out and is of little commercial value. Apparently the presence of the protein in the starch prevents any approximation to complete conversion of the starch into dextrose and hinders complete crystallization of the converted product. It seems to be the fact that the greater the percentage of residual protein in the starch the higher the percentage of hydrol. The hydrol contains a considerable amount of dextrose. As a result the yield of sugar, in a salable form, falls considerably short of the actual amount of dextrose produced by the conversion of the starch. Moreover, the operations involved in the crystallization of the dextrose and the separation of the crystals from the mother liquor are complicated, expensive and require considerable time and factory floor space. Our invention seeks to avoid all these difficulties, to produce a pure starch for converting or other purposes, to improve upon and simplify the processes of manufacturing glucose and corn sugar and to improve the character of these products themselves, by subjecting the starch, precedent to converting, to a treatment which will eliminate all or substantially all of the residual protein impurities which, as stated, are incapable of removal by any known mechanical means capable of utilization on a commercial scale. This elimination of the protein impurities is accomplished by subjecting the material mixed with water to a suitable treatment which makes the protein soluble without appreciably affecting the starch. The protein dissolves in the water and the starch is thereupon removed from the water and dissolved protein in any suitable manner. Preferably this treatment consists in subjecting the material in suspension in a relatively large volume of water to the enzymic action of proteolytic bacteria under conditions which bring about the solubilizing of the protein. It is well known that the enzymes produced by bacteria are the active agents for bringing about reactions of this character. The protein is decomposed or split but preferably not deeply enough to produce any appreciable amount of foul gases. The bacteria which we prefer to employ are members of the *Bacillus putrificus* group, the particular organism best calculated to serve the purpose being Group No. B. 121.1233111 in accordance with the descriptive chart of the Society of American Bacteriologists endorsed by the society for general use at the annual meeting December 31, 1907. In order to get the best results the starch, after being inoculated is allowed to settle, the liquid containing the products of bacterial action withdrawn, fresh water mixed in, and these operations repeated from time to time until the liquefying action of the bacteria is complete, the material being maintained at a temperature most favorable to the growth and activity of the germ, namely, at a temperature of from 100° to 105° Fahrenheit.

To give a specific example, the process of purification may be carried out as follows: The starch from the starch tables is mixed with water to a density of, say, 21° Baumé, the water being warmed so as to give the mixture the desired temperature of 100° to 105° Fahrenheit, which temperature may be maintained in any suitable manner, for example, by carrying on the process in a room heated to this temperature and by heating the replenishing water to a like temperature. The starch is placed in a vat provided with any suitable agitating means and is inoculated with a culture of the bacteria and stirred for about two hours. It is then allowed to stand for twenty hours, more or less, to give the starch a chance to settle. The water is then drawn off and fresh water added and mixed with the starch and the mixture kept in agitation for another two hours or until the starch is put into suspension, after which the starch is allowed to settle, the water decanted, and fresh water added as before. Each of these series of operations will thus consume twenty-four hours and the whole operation may require from six to twelve days, more or less, in accordance with the amount of protein in the starch. After the last decantation we have found it desirable to thoroughly wash the starch with water although this washing operation may not be essential. We have found that to get the best results the starch liquor after inoculation should have at the start of bacterial action at least two million bacteria per cubic centimeter. Test shows that there is progressive, if somewhat irregular, diminution of the protein content of the starch from day to day.

In order to illustrate the importance of our invention when considered as an improvement in the manufacture of sugar, we will next describe the steps necessary to manufacture the purified starch into a sugar of relatively high dextrose content. The starch is diluted with water to a density of approximately 10° Baumé, is acidified with a suitable acid, for example, hydrochloric acid, to give an acidity of .12%, and is then converted. The conversion is preferably carried on at a relatively low pressure, say twenty pounds per square inch, in a closed steam jacketed kettle and may require from one and one-half to two hours. The converted liquor is cooled, neutralized, kieselguhr added, filter pressed to remove suspended particles, and then concentrated in a vacuum pan to the density of substantially 42° Baumé. It is entirely unnecessary to bone char filter the converted liquor either before or after evaporation. After the liquor has been evaporated it is cast upon the floor or in mold pans and allowed to crystallize. Seed crystals may be used for initiating the crystallization. The entire yield of the conversion step will solidify and the solid cakes may afterwards be broken or ground and the material dried in the form of granules or a powder.

We prefer, however, to depart somewhat from the common practice with reference to the crystallization of the product and have found that the time consumed for the crystallization of the material may be considerably reduced by beating the concentrated liquor for several minutes so that it will have the consistency of whipped cream. After this the sugar is run into pans and dried and ground as before mentioned. The step of beating the converted liquor is not claimed herein, being the sole invention of applicant Paul W. Allen and the subject of application Serial No. 277,579 filed February 17, 1919.

By the method outlined it is possible to manufacture a corn sugar almost perfectly white in color, without bitter taste and which may contain, if desired, up to 98% of dextrose.

It will be understood that in outlining the process as above we have sought merely to give a typical example of the manner in which our invention may be practiced. The invention is not to be considered as limited to the particular details of temperature, pressure and the like, which may be readily varied as occasion requires by those skilled in this general art. We have enlarged particularly upon the relation of the invention to the manufacture of grape sugar because it is the manufacture of this product, and especially in the manufacture of a high dextrose sugar, that the elimination of proteins from the starch is of the greatest benefit from the point of view of economy. It will be understood, however, that the invention is equally concerned with the production of glucose or other conversion products of starch, and that it provides an important improvement in the manufacture of any product from starch in which it is advantageous to have the starch free from protein impurities. While the method of this invention is of particular utility in the manufacture of products from Indian corn, because of the peculiar difficulties in making a complete separation between the starch and protein of this grain, the method may be employed to advantage in the manufacture of starch and starch products from other amylaceous substances.

We claim:

1. Method of purifying corn starch of its residual protein which consists in decomposing substantially all of the residual protein in the starch by the action of proteolytic bacteria and effecting the removal of the decomposed matter from the starch.

2. Method of purifying commercial corn starch of its residuel protein which consists in making substantially all of the protein impurity in the starch soluble by the action of proteolytic enzymes that do not act appreciably on the starch and separating the starch from the soluble protein.

3. Method of purifying corn starch of its residual protein which consists in subjecting the material in suspension in a liquid to the action of proteolytic bacteria capable of decomposing the residual protein, allowing the starch to settle and decanting the liquid.

4. Method of purifying starch of residual protein which consists in inoculating the material in suspension in water with a selected culture of proteolytic bacteria, allowing it to stand while maintaining the temperature thereof at substantially 100° to 105° Fahrenheit to decompose substantially all of the residual protein in the starch, and separating the decomposed protein from the starch.

5. Method of purifying starch of residual protein which consists in inoculating the material in suspension in water with a selected culture of proteolytic bacteria capable of liquefying the residual protein, making repeated separations between the starch and liquid and mixing fresh water with the starch after each such separation until substantially all of the protein impurity is removed.

6. Improvement in the method of manufacturing starch from Indian corn which consists in making a separation between the starch and the bulk of the protein and other non-starch substances of the corn, inoculating the starch and residual protein in suspension in water with a selected culture of proteolytic bacteria capable of liquefying the residual protein, making repeated separations between the starch and liquid, mixing fresh water with the starch after each such separation until substantially all of the protein impurity is removed, and maintaining the temperature of the mixture always at approximately 100° to 105° Fahrenheit.

7. Improvement in the method of manufacturing starch from Indian corn which consists in making a separation between the starch and the bulk of the protein and other non-starch substances of the corn, inoculating the starch and residual portein in suspension in water, maintained at a temperature of substantially 100° to 105° Fahrenheit, with a selected culture of proteolytic bacteria, allowing the starch to settle, decanting the liquid and mixing in fresh water repeatedly until substantially all of the protein is removed.

8. Method of purifying corn starch of residual protein which consists in inoculating the material mixed with water, with a selected culture of proteolytic bacteria, agitating the mixture until all starch is in suspension, then allowing the starch to settle and decanting the liquid and adding fresh water, agitating, settling and decanting repeatedly, always maintaining the temperature of the mixture at approximately 100° to 105° Fahrenheit.

9. Method of purifying starch from residual protein which consists in inoculating the material mixed with water, with a selected culture of proteolytic bacteria, agitating the mixture, then allowing the starch to settle and decanting the liquid and adding fresh water, repeating the operations of agitating, settling and decanting, always maintaining the temperature of the mixture at approximately 100° to 105° Fahrenheit, and finally washing the starch with water.

10. Method of purifying starch of residual protein which consists in inoculating the starch with a selected culture of bacteria of the group *Bacillus putrificus* B. No. 121.1233111 according to the descriptive chart of the Society of American Bacteriologists endorsed by the society for general use December 31, 1907, to remove substantially all of the protein impurity in the starch, and making a separation between the liquefied protein and the starch.

11. Method of purifying starch of residual protein which consists in making a separation between the starch and the bulk of the protein and other non-starch substances of the corn, inoculating the material mixed with water with a selected culture of bacteria of the group *Bacillus putrificus* B. No. 121.1233111 according to the descriptive chart of the Society of American Bacteriologists endorsed by the society for general use December 31, 1907, allowing the starch to settle, decanting the liquid, mixing in fresh water and repeating the operations of mixing in fresh water, settling and decanting until substantially all the protein is removed, always keeping the mixture at a temperature of substantially 100° to 105° Fahrenheit.

12. Method of manufacturing grape sugar which comprises first inoculating corn starch with proteolytic bacteria capable of decomposing the residual protein in the starch to decompose substantially all of the protein impurity in the starch and removing the decomposed protein, and then converting the starch and reducing the entire yield of the conversion to a solid state.

13. Method of manufacturing grape sugar which comprises first inoculating corn starch with proteolytic bacteria capable of liquefying the residual protein therein to decompose substantially all of the protein impurity in the starch and removing the liquefied protein, and then converting the starch and reducing the entire yield of the conversion to a solid state by evaporation and crystallization.

14. Improved method of manufacturing a solid saccharine product from starch which comprises first removing from the starch all traces of protein, then converting the starch into sugar, and reducing the entire yield of the conversion to a solid state by evaporation and crystallization.

15. Method of purifying commercial corn starch of its residual protein which consists in subjecting the material in water to the action of proteolytic enzymes that do not act appreciably on the starch to make substantially all of the protein impurity soluble, and separating the starch from the water and dissolved protein.

16. Improvement in the art of manufacturing a solid saccharine product from corn starch which consists in making soluble and dissolving in water substantially all the residual protein impurity in the starch, separating the starch from the water and dissolved protein, converting the starch and evaporating and crystallizing the entire yield of the conversion step.

ADOLPH W. H. LENDERS.
PAUL W. ALLEN.